(12) United States Patent
Patel

(10) Patent No.: US 10,818,166 B2
(45) Date of Patent: Oct. 27, 2020

(54) VEHICLE AUDIBLE SIGNAL PROCESSING SYSTEMS

(71) Applicant: Allstate Solutions Private Limited, Bangalore (IN)

(72) Inventor: Payal Patel, Bangalore (IN)

(73) Assignee: Allstate Solutions Private Limited, Bangalore (IN)

(*) Notice: Subject to any disclaimer, the term of this patent is extended or adjusted under 35 U.S.C. 154(b) by 275 days.

(21) Appl. No.: 15/980,641

(22) Filed: May 15, 2018

(65) Prior Publication Data

US 2019/0279503 A1 Sep. 12, 2019

(30) Foreign Application Priority Data

Mar. 9, 2018 (IN) .............................. 201841008767

(51) Int. Cl.
*G08G 1/01* (2006.01)
*G08G 1/04* (2006.01)
*G01S 5/06* (2006.01)

(52) U.S. Cl.
CPC ............. *G08G 1/0133* (2013.01); *G08G 1/04* (2013.01); *G01S 5/06* (2013.01)

(58) Field of Classification Search
CPC ...... G08G 1/0133; G08G 1/04; G08G 1/0129; G08G 1/0141; G08G 1/0112; G01S 5/06; G01S 5/18; G10L 25/51
See application file for complete search history.

(56) References Cited

U.S. PATENT DOCUMENTS

| 2003/0225516 | A1 | 12/2003 | DeKock et al. |
| 2014/0056438 | A1 | 2/2014 | Baalu et al. |
| 2017/0025000 | A1* | 1/2017 | Lagassey ............... G08G 1/094 |
| 2019/0279503 | A1* | 9/2019 | Patel .................... G08G 1/0141 |

OTHER PUBLICATIONS

Jun. 30, 2020—(IN) Examination Report—App. No. 201841008767.

\* cited by examiner

*Primary Examiner* — Daniel Pihulic
(74) *Attorney, Agent, or Firm* — Banner & Witcoff, Ltd.

(57) ABSTRACT

Vehicle audible signal processing methods, systems, and apparatuses are disclosed. An example method comprises detecting a plurality of audible signals in a geographic area, determining locations of the plurality audible signal, determining a location of the apparatus, determining, based on the determined locations of the plurality of audible signals and based on the determined location of the apparatus, waveform characteristics for the plurality of audible signals, comparing the determined waveform characteristics for the plurality of audible signals to one or more signal signatures, determining, over a threshold period of time, a quantity of the plurality of audible signals that comprise waveform characteristics matching signatures of the one or more signal signatures, and determining, based on the quantity, a traffic density for the geographic area.

20 Claims, 9 Drawing Sheets

VEHICLE AUDIBLE SIGNAL PROCESSING SYSTEMS

CROSS REFERENCE TO RELATED APPLICATIONS

This application claims priority under 37 CFR 1.55 to Indian Patent Application No. 201841008767 filed on Mar. 9, 2018 and entitled, "Vehicle Audible Signal Processing Systems." Indian Patent Application No. 201841008767 is incorporated herein by reference in its entirety.

TECHNICAL FIELD

Aspects of the present disclosure generally relate to vehicle audible signal processing methods, systems, and apparatuses.

BACKGROUND

Often, traffic-analyzing systems rely on extensive networks of a plurality of end devices, centrally compiling information from the plurality of end devices at a remote server. However, relying on such extensive networks creates time delays and requires intense network maintenance. Additionally, such systems rely on user reporting and/or locations of the end devices to make determinations.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure concern systems, methods, and apparatuses to measure the noise pollution, traffic congestion, and create vehicle driver behavior profiles. Such systems, methods, and apparatuses may detect, by a computing device, a plurality of audible signals in a geographic area, determine locations of the plurality audible signals, determine a location of the apparatus, determine, based on the determined locations of the plurality of audible signals and based on the determined location of the apparatus, waveform characteristics for the plurality of audible signals, compare the determined waveform characteristics for the plurality of audible signals to one or more signal signatures, determine, over a threshold period of time, a quantity of the plurality of audible signals that comprise waveform characteristics matching signatures of the one or more signal signatures, and determine, by the computing device and based on the quantity, a traffic density for the geographic area.

DETAILED DESCRIPTION

Figure 1:
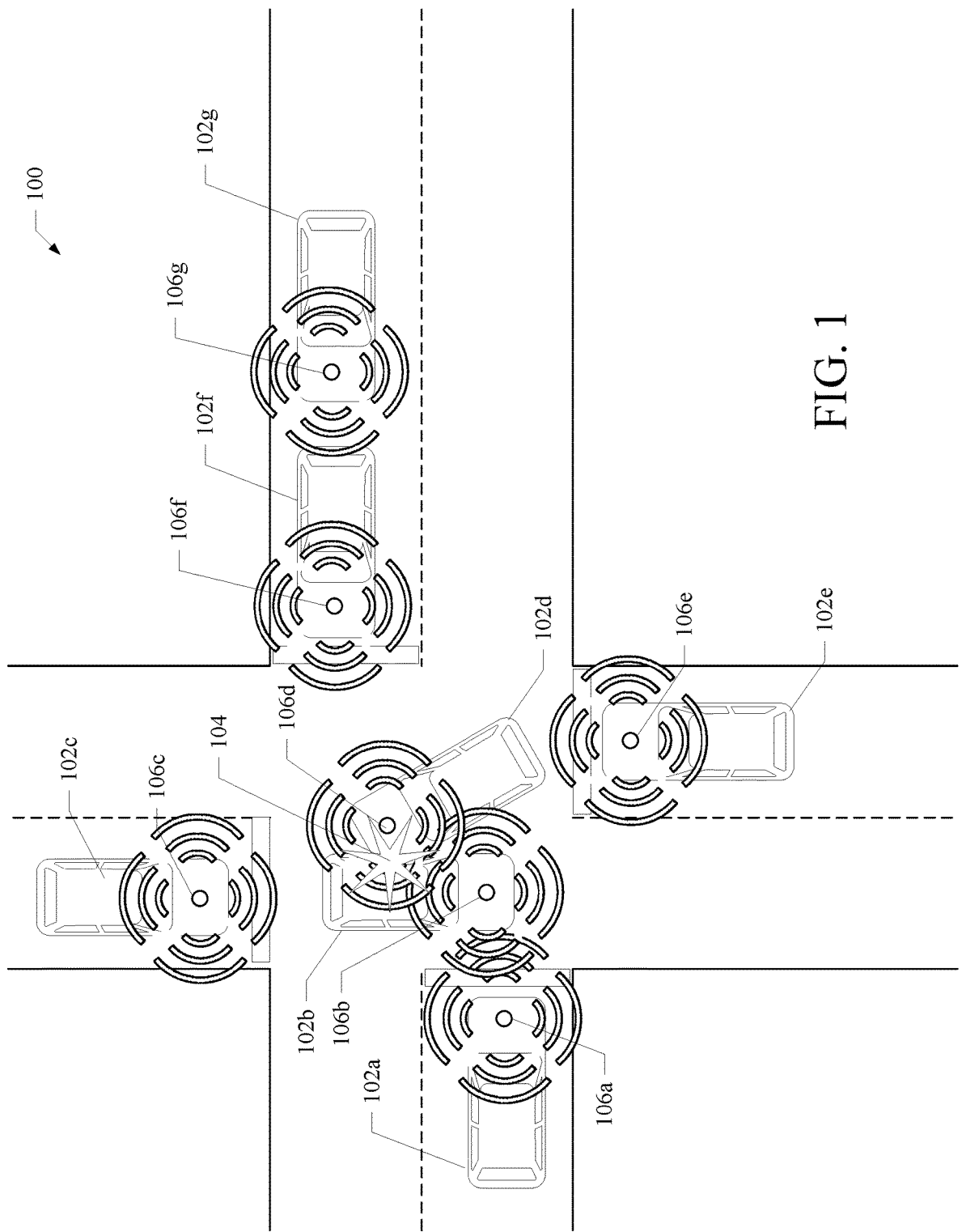
FIG. 1 is an example environment in which the example audible signal processing systems disclosed herein may operate and comprising a number of vehicles activating audible signals.

In the following description of the various embodiments, reference is made to the accompanying drawings, which form a part hereof, and in which is shown by way of illustration, various embodiments of the disclosure that may be practiced. It is to be understood that other embodiments may be utilized.

Aspects of the disclosure concern systems, methods, and apparatuses to measure noise pollution, traffic congestion, and create vehicle driver behavior profiles. An example system comprises a vehicle comprising a vehicle horn or other audible warning system associated with the vehicle, and a computing device comprising one or more processors, and memory storing instructions that, when executed by the one or more processors, cause the computing device to detect a plurality of audible signals in a geographic area surrounding the vehicle, determine locations of the plurality audible signals, determine a location of the computing device, determine, based on the determined locations of the plurality of audible signals and based on the determined location of the computing device, waveform characteristics for the plurality of audible signals, compare the determined waveform characteristics for the plurality of audible signals to one or more signal signatures, determine, over a threshold period of time, a quantity of the plurality of audible signals that comprise waveform characteristics matching signatures of the one or more signal signatures, and determine, based on the quantity of the plurality of audible signals, a traffic density for the geographic area.

In some examples, the threshold period of time is from a first time at which an engine of the vehicle is turned on to a second time at which the engine of the vehicle is turned off.

In some examples, the instructions, when executed, cause the computing device to filter the audible signal to remove signals with frequencies outside of a frequency range.

In some examples, the frequency range comprises 400 hertz (Hz) to 500 Hz.

In some examples, the plurality of audible signals is a first plurality of audible signals, and wherein the instructions, when executed, cause the computing device to determine, for the vehicle, lengths of time that the vehicle emits a second plurality of audible signals, and determine, based on the lengths of time and based on a quantity of the second plurality of audible signals within a threshold period of time, a driver profile.

In some examples, the instructions, when executed, cause the computing device to determine, based on the quantity of the plurality of audible signals, a noise pollution level.

In some examples, the instructions, when executed, cause the computing device to determine, based on the quantity of the plurality of audible signals, a vehicle emissions pollution level.

An example method comprises detecting, by a computing device, a plurality of audible signals in a geographic area, determining locations of the plurality of audible signals, determining a location of the apparatus, determining, based on the determined locations of the plurality of audible signals and based on the determined location of the apparatus, waveform characteristics for the plurality of audible signals, comparing the determined waveform characteristics for the plurality of audible signals to one or more signal signatures, determining, over a threshold period of time, a quantity of the plurality of audible signals that comprise waveform characteristics matching signatures of the one or more signal signatures, and determining, by the computing device and based on the quantity, a traffic density for the geographic area.

In examples wherein the plurality of audible signals is a first plurality of audible signals, the method further comprises determining, for an audible signal source that produces a second plurality of audible signals having waveform characteristics that match at least one signature of the one or more signal signatures, lengths of time of the second plurality of audible signals, and determining, based on the lengths of time and based on a quantity of the second plurality of audible signals within a threshold period of time, a driver profile.

In some examples, the audible signals comprise vehicle horns.

An example apparatus comprises one or more processors, and memory storing instructions that, when executed by the one or more processors, cause the apparatus to detect a plurality of audible signals in a geographic area, determine locations of the plurality audible signals, determine a location of the apparatus, determine, based on the determined locations of the plurality of audible signals and based on the determined location of the apparatus, waveform characteristics for the plurality of audible signals, compare the determined waveform characteristics for the plurality of audible signals to one or more signal signatures, determine, over a threshold period of time, a quantity of the plurality of audible signals that comprise waveform characteristics matching signatures of the one or more signal signatures, and determine, based on the quantity, a traffic density for the geographic area.

In examples wherein the plurality of audible signals is a first plurality of audible signals, the instructions, when executed, cause the apparatus to determine, for an audible signal source that produces a second plurality of audible signals having waveform characteristics that match at least one signature of the one or more signal signatures, lengths of time of the second plurality of audible signals, and determine, based on the lengths of time and based on a quantity of the second plurality of audible signals within a threshold period of time, a driver profile.

Other examples are further disclosed below. For example, FIG. 1 is an example environment 100 comprising a number of vehicles activating audible signals in which the example audible signal processing systems disclosed herein may operate. In the illustrated example of FIG. 1, a plurality of vehicles 102*a*-102*g* may be involved in a traffic event 104. As a result, the plurality of vehicles 102*a*-102*g* may activate a plurality of audible signals 106*a*-106*g*. In some examples, one or more of the plurality of audible signals 106*a*-106*g* are vehicle horns. In some examples, one or more of the plurality of audible signals 106*a*-106*g* are sirens.

Often, the plurality of vehicles 102*a*-102*g* activates the plurality of audible signals 106*a*-106*f* as a warning, to get objects to move, to get objects to stop moving, etc. However, in some examples, the plurality of vehicles 102*a*-102*g* activates audible signals in futile and/or unproductive efforts such as, for example, during traffic event 104. In traffic event 104, vehicles 102*b* and 102*d* have collided such that vehicles 102*a*, 102*c*, and 102*e*-102*g* cannot proceed along the route. Until the vehicles 102*b* and 102*d* are cleared, activation of vehicle horns from vehicles 102*a*-102*g* may be counterproductive because the traffic event 104 prevents movement of such vehicles. Such horn activation may uncontrollably continue, however, and lead to unnecessary noise pollution.

Figure 2:
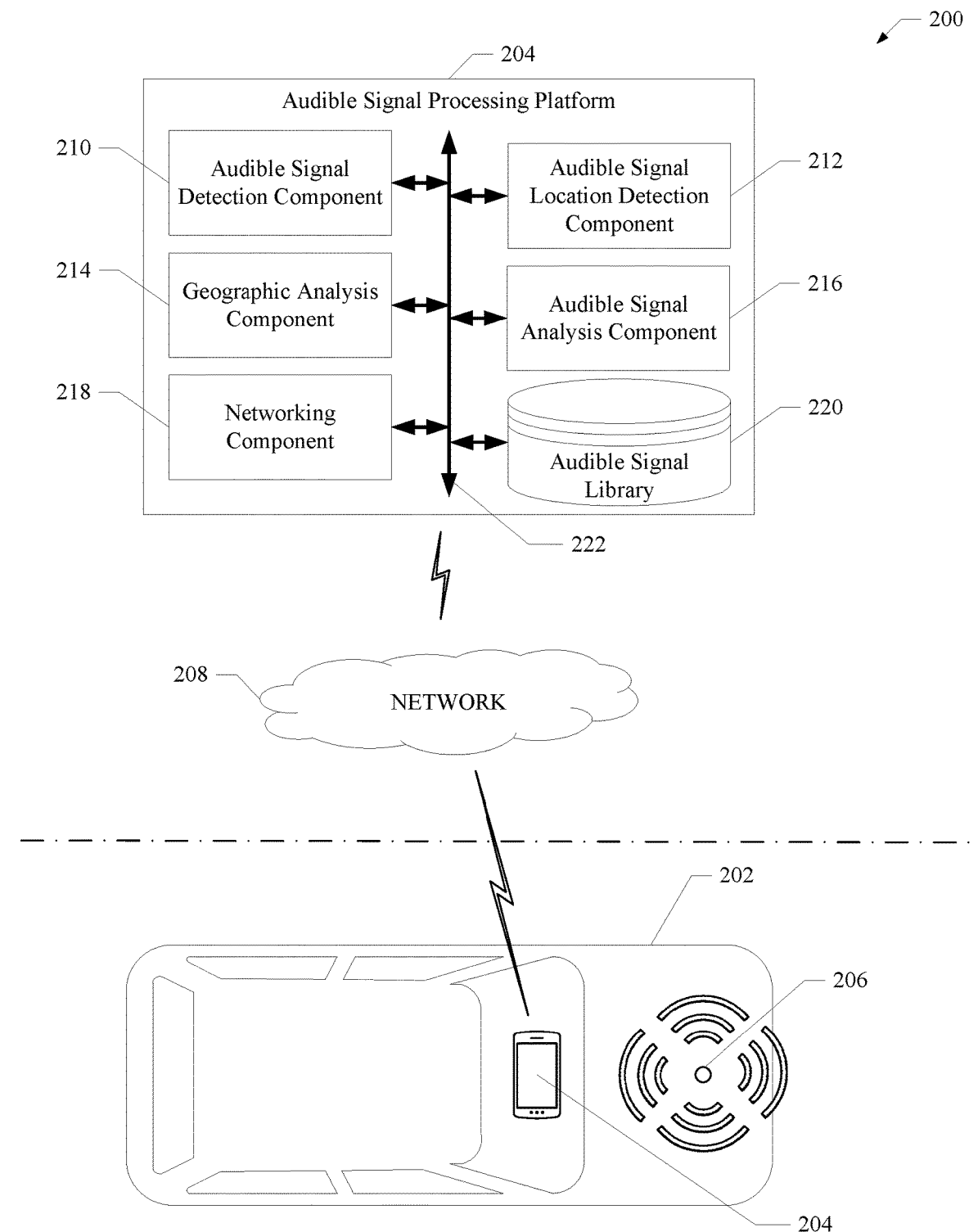
FIG. 2 is an example audible signal processing platform in accordance with the teachings of this disclosure.

Aspects of the present disclosure pertain to systems, methods, and apparatuses to measure the noise pollution caused in situations such as traffic event 104, correlate such noise pollution to traffic congestion, and analyze horn activation by one or more individuals at or around traffic event 104 to create behavior profiles. In some examples, the analysis of the noise pollution, traffic, and/or driver profiles is conducted in an environment 200 via an audible signal processing platform 204, as further described with reference to FIG. 2. As shown in FIG. 2, the audible signal processing platform 204 may be a standalone device such as a server, an application on a smart phone, a portable device, etc. However, the audible signal processing platform 204 may be disposed with a vehicle 202 or other infrastructure and perform as further disclosed herein. In examples wherein the audible signal processing platform 204 is an application on a smart phone, the audible signal processing platform 204 may be disposed within the vehicle 202 and may detect audible signals from the vehicle 202 such as, for example, vehicle horn 206. As further disclosed herein, the audible signal processing platform 204 may determine noise pollution, traffic congestion, and driver behavior on a single device. In some examples, the audible signal processing platform 204 communicates externally via a network 208 with one or more remote computing devices.

The audible signal processing platform 204 may comprise an example audible signal detection component 210, an example audible signal location detection component 212, an example geographic analysis component 214, an example audible signal analysis component 216, an example networking component 218, and an example audible signal library 220. The audible signal detection component 210, the audible signal location detection component 212, the geographic analysis component 214, the audible signal analysis component 216, the networking component 218, and the audible signal library 220 may be coupled via a connector 222 such as, for example, a bus.

In the illustrated example, the audible signal detection component 210 is configured to detect and/or distinguish signals received via a transducer such as, for example, a microphone. In some examples, the transducer may have an audible range of about 20 Hz to about 20 kilohertz (kHz). In some examples, the audible signal detection component 210 identifies vehicle audible signals such as, for example, horns or sirens, by comparing waveform characteristics of the vehicle audible signals (e.g., frequency, wavelength, intensity, etc.) to known horn or siren signatures stored within the audible signal library 220. In some examples, the audible signal detection component 210 filters out background signals by removing signals having frequencies not associated with the known horn or siren signatures.

The audible signal location detection component 212 is configured to determine the location of audible signal sources and the audible signal processing platform 204. In some examples, the audible signal location detection component 212 uses sounds pressure to determine the location of audible signal sources relative to the audible signal processing platform 204. In some examples, the audible signal location detection component 212 determines a time difference between an arrival of an audible signal at a first microphone and the arrival of the audible signal at a second microphone spaced apart from the first microphone in order to determine the location of the audible signal source. Other techniques such as, for example, triangulation may be used in connection with or in replace of the aforementioned techniques.

In some examples, the audible signal location detection component 212 accounts for location changes of the audible signal sources and the audible signal processing platform 204, because waveform characteristics of audible signals may vary if the distance between a source and a receiver varies over time. In some examples, the audible signal location detection component 212 utilizes global positioning systems (GPS), accelerometers, gyroscopes, and equations to determine and update locations of audible signal sources and receivers.

The geographic analysis component 214 is configured to determine the impact of detected audible signals within a particular geographic area. For example, the amount of vehicle audible signals being activated and the lengths of the activated audible signals may create a notable amount of noise pollution. In some examples, the amount of noise pollution may a factor in determinations of whether to place a school, neighborhood, library, etc. in a geographic area. Additionally, the geographic analysis component 214 may correlate the audible signals (and/or the amount of noise pollution) with a number of vehicles and/or the carbon emissions associated with the number of vehicles to determine air pollution caused by traffic events in the geographic area. Even further, the geographic analysis component 214 may collect traffic event data for a geographic area over time to determine whether a geographic area is more prone to traffic events (e.g., accidents are statistically high in the geographic area) and/or is a potential cause of traffic events (e.g., geographic area has poorly engineered infrastructure). In some examples, the geographic analysis component 214 may allocate traffic event causation to the geographic area and/or anticipate future traffic events in the geographic area.

The audible signal analysis component 216 is configured to monitor the audible signals over one or more threshold periods of time to determine both the length of the audible signals and the number of times audible signals are activated. Based on the length of the audible signals and the number of times audible signals are activated, the audible signal analysis component 216 may determine driver behaviors, unique driver profiles, noise pollution, emissions pollution, and/or the traffic density of a geographic area.

The networking component 218 is configured to communicate, via the network 208, with one or more remote computing devices. In examples wherein the audible signal processing platform 204 is a server, the networking component 218 may acquire sensor data from one or more mobile devices, vehicles, or infrastructure devices. In some such examples, the audible signal processing platform 204 performs similarly as disclosed herein with the received sensor data.

The audible signal library 220 may comprise one or more computer readable storage mediums configured to store waveform characteristics of vehicle horns and sirens of various vehicle makes and models. The audible signal library 220 may comprise waveform characteristics such as, for example, frequency, wavelength, amplitude, intensity, power, energy, period, attenuation characteristics, phase, etc. for each vehicle make and model and/or aftermarket products. Such waveform characteristics may be formatted into audible signal signatures for comparison therewith. In some examples, the audible signal library 220 may store geographic impact data, driver profile data, traffic density data, and/or detected waveform characteristics for audible signals that don't match with the existing audible signal signatures.

Figure 3:
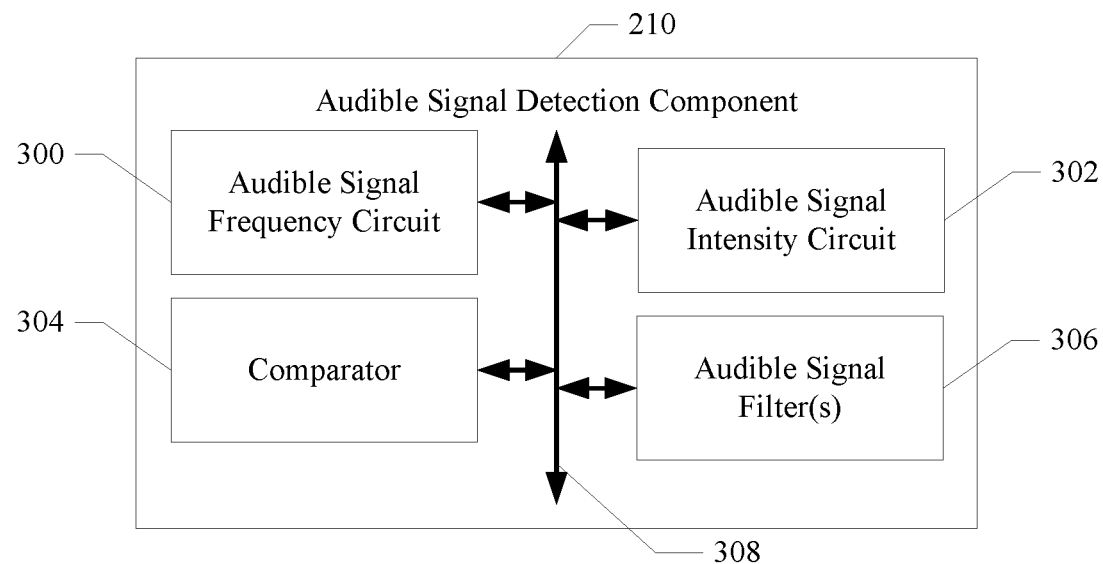
FIG. 3 is an example audible signal detection component in accordance with the teachings of this disclosure.

The audible signal detection component 210, further shown in FIG. 3, may comprise an example audible signal frequency circuit 300, an example audible signal intensity circuit 302, an example comparator 304, and one or more example audible signal filters 306. The audible signal frequency circuit 300, the audible signal intensity circuit 302, the comparator 304, and the one or more audible signal filters 306 may be coupled via a connector 308 such as, for example, a bus. While the audible signal frequency circuit 300 and the audible signal intensity circuit 302 are described as "circuits" and may be implemented in physical circuits in some embodiments, the audible signal frequency circuit 300 and the audible signal intensity circuit 302 may alternatively be implemented in software.

The audible signal frequency circuit 300 detects, via a microphone or other transducer, audible signals from one or more audio sources, such as, for example, vehicle horns. However, because audible signals may comprise one or more different waveforms, the audible signal frequency circuit 300 may transmit the detected audible signals to the audible signal filters 306. The audible signal frequency circuit 300 receives filtered audible signals from the audible signal filters 306 and measures the frequencies of such signals, in hertz (Hz), for identification. The audible signal frequency circuit 300 may comprise an oscillometer to measure the frequencies and/or may include software to digitally measure the frequencies. The audible signal frequency circuit 300 transmits the measured frequencies to the comparator 304.

The audible signal intensity circuit 302 detects, via a microphone, the intensity of the filtered audible signals for identification. The intensity may be measured in watts per square meter (W/m$^2$) and converted into decibels (dB). Alternatively, the audible signal intensity circuit 302 may determine sound pressure in Pascals (Pa) and convert to dB.

In some examples, the audible signals are detected as 16-bit audio, wherein the audible signals may be represented as numbers ranging between −32768 and +32767. The audible signals may be normalized by 32768 so that the range is approximately between −1 and +1.

In some examples, devices implementing the audible signal processing platform 204 may comprise automatic gain control that may adapt detected audible signals to an average sound level. In such examples, the actual sound pressure level may be obfuscated. In some such examples, the audible signal processing platform 204 may turn off the automatic gain control, calibrate against a sound meter, and approximate an A-weighted sound pressure level (dB(A)), based on a measured frequency and Equations 1 and 2 set forth below.

$$R_A(f) = \frac{12194^2 \cdot f^4}{(f^2 + 20.6^2)\sqrt{((f^2 + 107.7^2)(f^2 + 737.9^2))}\,(f^2 + 12194^2)} \quad \text{Equation 1}$$

$$A(f) = 20\log_{10}(R_A(f)) + 2 \quad \text{Equation 2}$$

The audible signal intensity circuit 302 may transmit the measured/estimated intensities to the comparator 304.

The comparator 304 retrieves measured frequencies from the audible signal frequency circuit 300, measured intensities from the audible signal intensity circuit 302, and audible signal signatures from the audible signal library 220. The comparator 304 compares, in order to find a match, the measured frequencies and/or measured intensities to frequencies and/or intensities associated with the audible signatures. The comparator 304 identifies audible signals as vehicle horns or sirens when the measured frequencies and/or measured intensities match with one or more frequencies and/or intensities associated with the audible signatures. As described herein, the comparator 304 may identify audible signals as vehicle horns when the measured frequencies are within 405-500 Hz and/or when the measured intensities are within 107-112 decibels.

The one or more audible signal filters 306 may comprise high-pass filters, low-pass filters, band-pass filters, band-stop filters, comb filters, or any combination thereof. The one or more audible signal filters 306 may be used to reject signals above or below a frequency range, pass signals within the frequency range, etc. For example, a high-pass filter may be used to pass signals over 260 Hz (because human speech may range between 85-255 Hz), a band-pass filter may be used to pass signals within the frequency range of 405-500 Hz (because vehicle horns may range between 405-500 Hz), a low-pass filter may be used to pass signals under 550 Hz, etc.

In some examples, Linear Predictive Coding (LPC), Linear Prediction Cepstral Coefficient (LPCC), or Mel Frequency Cepstral Coefficient (MFCC) algorithms may be utilized to determine whether an audible signal is a vehicle horn. For example, the MFCC algorithm may involve dividing a signal into short frames, calculating, for each frame, the periodogram estimate of the power spectrum, applying the mel filterbank to the power spectra, summing the energy in each filter, taking the logarithm of all filterbank energies, taking the Discrete Cosine Transform (DCT) of the log filterbank energies, keeping DCT coefficients 2-13, and discarding the rest. Such information may be utilized by machine learning algorithms to classify whether an audible signal is a vehicle horn.

Figure 4:
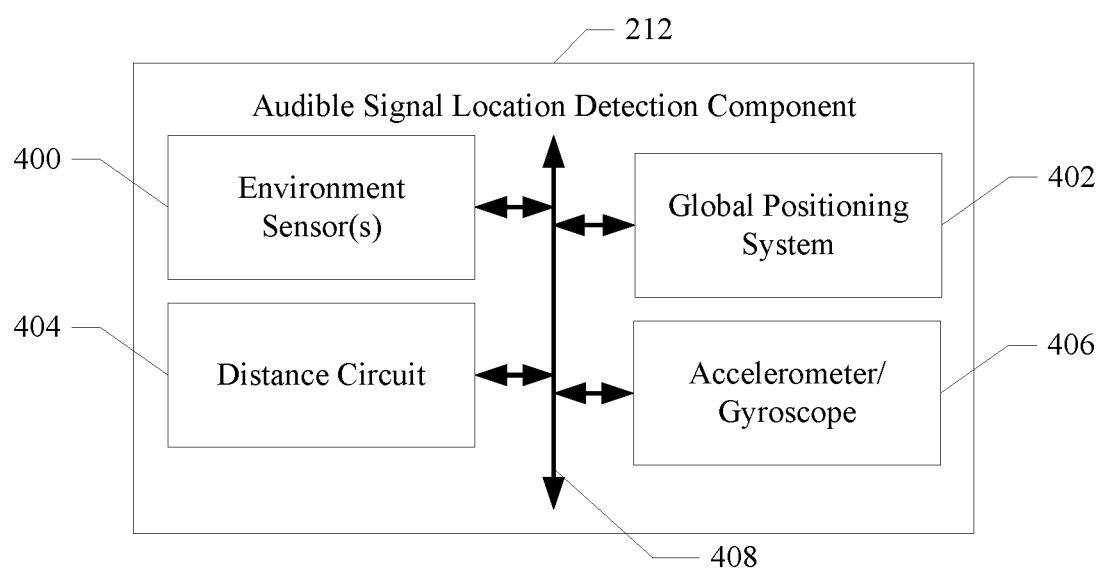
FIG. 4 is an example audible signal location detection component in accordance with the teachings of this disclosure.

The audible signal location detection component 212, as further shown in FIG. 4, may comprise example environment sensors 400, an example GPS 402, an example distance circuit 404, and an example accelerometer or gyroscope 406. The environment sensors 400, the GPS 402, the distance circuit 404, and the accelerometer or gyroscope 406 may be coupled via a connector 408 such as, for example, a bus. While the distance circuit 404 is described as a "circuit" and may be implemented in physical circuits in some embodiments, the distance circuit 404 may alternatively be implemented in software.

The environment sensors 400 are configured to determine the mediums through which the audible signals travel. In examples wherein the audible signal processing platform 204 is connected with a vehicle (e.g., paired with or directly connected therewith), the environment sensors 400 may determine whether the windows of the vehicle are open, partially open, or closed such that audible signals would need to travel through the window glass (which may affect audible signal attenuation) prior to detection by the audible signal detection component 210. Additionally or alternatively, the environment sensors 400 may comprise one or more cameras that may take images and/or video to determine mediums around the audible signal processing platform 204. In some examples, the environment sensors 400 may comprise a microphone to determine whether windows of the vehicle are open based on the sound caused by wind entering the vehicle at increasing speeds.

The GPS 402 is configured to determine the location of the audible signal processing platform 204 and/or motion of the audible signal processing platform 204 by identifying a change in the location of the audible signal processing platform 204 over time.

The distance circuit 404 is configured to determine, based on waveform characteristics of the audible signals, based on the detected environment mediums, based on the location of the audible signal processing platform 204, based on the known attenuation characteristics of the detected environment mediums, and/or based on the signal signatures, the locations of the audible signal sources (912). The distance circuit 404 may utilize different techniques including sound pressure analysis, time difference of arrival using multiple microphones a known distance apart, triangulation, etc. The distance circuit 404 may be configured to determine whether the audible signal sources move (e.g., based on determining the location of the audible signal sources over time or detecting frequency variations associated with the Doppler Effect) (914). Based on the detected motion of the audible signal sources, the example distance circuit updates the location of the audible signal source (916).

In some examples, the distance circuit 404 may be configured to solve Equation 3, shown below:

$$f = \frac{(c + v_r)}{(c + v_s)} f_0 \qquad \text{Equation 3}$$

In Equation 3, f may correspond to the frequency detected by the audible signal detection component 210, $f_0$ may correspond to the frequency of the audible signal when it is activated at the audible signal source, $v_r$ may correspond to the velocity of the audible signal detection component 210, $v_s$ may correspond to the velocity of the audible signal source, and c may correspond to the speed of sound within a given medium. In examples wherein the audible signal detection component 210 and the audible signal source have the same velocity, $f=f_0$. In other examples, f is either greater than or less that $f_0$.

Based on Equation 3, the distance circuit 404 determines the velocity (and the location) of an audible signal source. However, in Equation 3, both $f_0$ and $v_s$ may be unknowns. Accordingly, in some examples, the distance circuit 404 may cycle through known frequencies within the audible signal library as potential values of $f_0$. For each $f_0$ value, the distance circuit 404 may determine a corresponding $v_s$. Such values may be analyzed to determine which $v_s$ value is most likely an accurate velocity for an audible source. In some examples, machine learning algorithms are used to determine the velocity of an audible source based on the aforementioned data and known sample data.

Based on Equation 4, shown below, the distance circuit 404 determines the distance of an audible signal source from the audible signal processing platform 204:

$$r = \sqrt{\frac{P_s}{4\pi I}} \qquad \text{Equation 4}$$

In Equation 4, $P_s$ may correspond to the power of the audible signal source (e.g., a vehicle horn), I may correspond to the intensity of the audible signal detected by the audible signal detection component 210, and r may correspond to a radial distance that the audible signal processing platform 204 is from the audible signal source. $P_s$ may be known for many vehicle makes and models and may be stored within the audible signal library 220. Once the audible signal detection component 212 identifies, based on determining a matching signal signature, the audible signal as belonging to a particular vehicle make and model, the distance circuit 404 may retrieve the $P_s$ value from the audible signal library 220. Because the audible signal intensity circuit 302 measures the intensity, and because $P_s$ is stored in the audible signal library 220, the distance circuit 404 may determine the distance r of the audio signal source from the audible signal processing platform 204. After a time t, the distance circuit 404 may determine a second distance r and, based on the change in distance over the time t, the distance circuit 404 may determine a velocity of the audible signal source. Having the velocity of the audible signal source, and the velocity of the audible signal processing platform 204 (from the GPS 402 and/or the accelerometer/gyroscope 406), the distance circuit 404 may determine, based on Equation 3 and the detected frequency f, the frequency $f_0$ of the audible signal for comparison by the audible signal detection component 210.

Based on Equation 5, shown below, the distance circuit 404 may determine a distance x of an audible signal source from the audible signal processing platform 204:

$$A = A_0 e^{-\alpha x}$$ Equation 5

In Equation 5, A may correspond to the amplitude of the audible signal detected by the audible signal detection component 210, $A_0$ may correspond to the amplitude of the audible signal when it is activated at the audible signal source, α may correspond to an attenuation coefficient that may be known for different mediums and may be stored within the audible signal library 220, and x may correspond to the distance of the audible signal source from the audible signal processing platform 204. In some examples, both $A_0$ and x may be unknowns. Accordingly, in some examples, the distance circuit 404 may cycle through known amplitudes within the audible signal library as potential values of $A_0$. For each $A_0$ value, the distance circuit 404 may determine a corresponding x. Such values may be analyzed to determine which x value is most likely an accurate distance for an audible source. In some examples, machine learning algorithms are used to determine the distance of an audible source based on the aforementioned data and known sample data.

In some examples, $A_0$ may be known for many vehicle makes and models and may be stored within the audible signal library 220. Once the audible signal detection component 212 identifies, based on determining a matching signal signature, the audible signal as belonging to a particular vehicle make and model, the distance circuit 404 may retrieve the $A_0$ value from the audible signal library 220. The distance circuit 404 may then determine the distance x. Of course, other techniques may be utilized to determine the distance and/or velocity of an audible source without departing from the present disclosure.

The accelerometer/gyroscope 406 may, independently or in addition to the GPS 402, determine motion of the audible signal processing platform 204. In some examples, the accelerometer/gyroscope 406 may detect changes in acceleration of the audible signal processing platform 204 at a more granular level than the GPS 402. For example, the accelerometer/gyroscope 406 may comprise a damped mass on a spring that is displaced proportionally to the amount of acceleration experienced by the mass, piezoelectric, piezoresistive, or capacitive materials, and/or a wheel mounted to a plurality of gimbals. Such configurations may provide accurate measurements of the acceleration, velocity, and/or position (e.g., by integration) of the audible signal processing platform 204.

Figure 5:
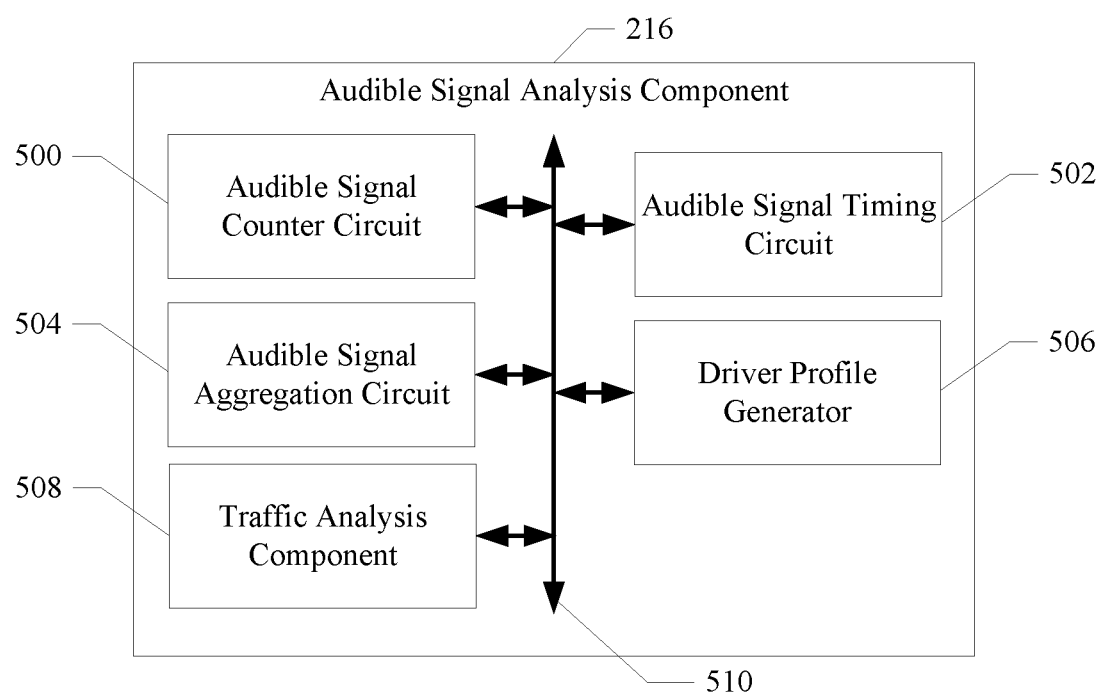
FIG. 5 is an example audible signal analysis component in accordance with the teachings of this disclosure.

The audible signal analysis component 216, as further shown in FIG. 5, may comprise an example audible signal counter circuit 500, an example audible signal timing circuit 502, an example audible signal aggregation circuit 504, an example driver profile generator 506, and an example traffic analysis component 508. The audible signal counter circuit 500, the audible signal timing circuit 502, the audible signal aggregation circuit 504, the driver profile generator 506, and the traffic analysis component 508 may be coupled via a connector 510 such as, for example, a bus. While the audible signal counter circuit 500, the audible signal timing circuit 502, and the audible signal aggregation circuit 504 are described as "circuits" and may be implemented in physical circuits in some embodiments, the audible signal counter circuit 500, the audible signal timing circuit 502, and the audible signal aggregation circuit 504 may alternatively be implemented in software.

The audible signal counter circuit 500 is configured to determine the number of audible signals that match a signal signature within a threshold amount of time. For example, for every audible signal that matches to a signal signature, an electric signal may be sent to the audible signal counter circuit 500 that activate one or more flip-flops, shift registers, etc. to increment a count of matching audible signals. Of course, the audible signal counter circuit 500 may be implemented with a processor and/or software to count the number of matching audible signals. The count of matching audible signals may be reset after a threshold amount of time, upon manual reset, etc.

The audible signal timing circuit 502 is configured to determine a length of time that an audible signal (which matches a signal signature) is active (e.g., from the time the audible signal is activated to the time the audible signal ceases). In some such examples, the audible timing circuit 502 sends an electric signal to one or more flip-flops, shift registers, etc. every time there is a clock pulse starting from a first time (e.g., from the time the audible signal is activated or first detected) and until a second time (e.g., the time the audible signal ceases or is no longer detected). The audible signal timing circuit 502 may convert, based on the clock cycle, the number of clock pulses into the length of time that the audible signal is active.

As disclosed herein, the length of a single audible signal may provide information regarding the behavior of the driver of the vehicle that produced the audible signal. For example, a single short vehicle horn may be a courteous reminder to another driver, whereas an overly long vehicle horn may be a sign of road rage. However, the number of times a horn is activated in combination with the lengths of each horn may provide even more information regarding driver behavior. Accordingly, the audible signal timing circuit 502 may further determine a threshold period of time for monitoring multiple audible signals from a single or multiple sources. For example, the audible signal timing circuit 502 may set the threshold period of time to the entirety of the trip of a vehicle (e.g., associated with a navigation destination, from engine on to engine off, frequently traveled routes, etc.), the audible signal timing circuit 502 may set the threshold period of time to be a static time frame (e.g., an hour) and periodically monitor over the static time frame, or any combination thereof. In such examples, the audible timing circuit may send an electric signal to one or more flip-flops, shift registers, etc. every time there is a clock pulse. Such signaling may continue until the number of clock pulses converted into a time meets the set threshold period of time.

The audible signal aggregation circuit 504 is configured to aggregate or otherwise compile the matching audible signals and the lengths of each audible signal. The audible signal aggregation circuit 504 may aggregate the audible signals detected from a single source or from multiple sources. In some examples, the audible signal aggregation circuit 504 aggregates matching audible signals from multiple sources and transmits this aggregated data to the traffic analysis component 508. In some examples, the audible signal aggregation circuit 504 aggregates matching audible signals from a single source and transmits this aggregated data to the driver profile generator 506. In some examples, the audible signal aggregation circuit 504 aggregates matching audible signals from all sources and transmits this aggregated data to an external server via the networking component 218.

As disclosed herein, the audible signal detection component 210 may identify an audible signal as vehicle horn belonging to a vehicle make and model. Additionally, the audible signal location detection component 212 may identify a location of an audible signal. Based on this data, the driver profile generator 506 may identify when subsequent audible signals come from the same audible signal source. Then, based on the lengths of audible signals coming from a single source and based the number of audible signals from that single source, the driver profile generator 506 may determine user behavior associated with a vehicle driver.

The traffic analysis component 508 is configured to determine, based on the aggregated data from the audible signal aggregation circuit 504, traffic density for a geographic area. For example, because numerous vehicles often activate vehicle horns at a high frequency during a traffic event, the traffic analysis component 508 may determine a traffic event is occurring based on a high amount of vehicle horn activations from multiple sources in a geographic area over a threshold amount of time. In some examples, a threshold decibel level may be set and the traffic analysis component 508 may compare the aggregated intensity of the multiple vehicle horns identified to the threshold decibel level whether there is traffic congestion. In some examples, a threshold number of vehicle horns may set and the traffic analysis component 508 may compare the total number vehicle horns identified to the threshold number of vehicle horns to determine whether there is traffic congestion. Additionally, the aggregated intensity of the multiple vehicle horns, the total number vehicle horns, and/or the number of audible sources (e.g., vehicles) may be used to determine the density of traffic. For example, the traffic analysis component 508 may determine that the number of identified audible sources exceeds a maximum number of vehicles that a route may receive before causing traffic congestion.

Figure 6:
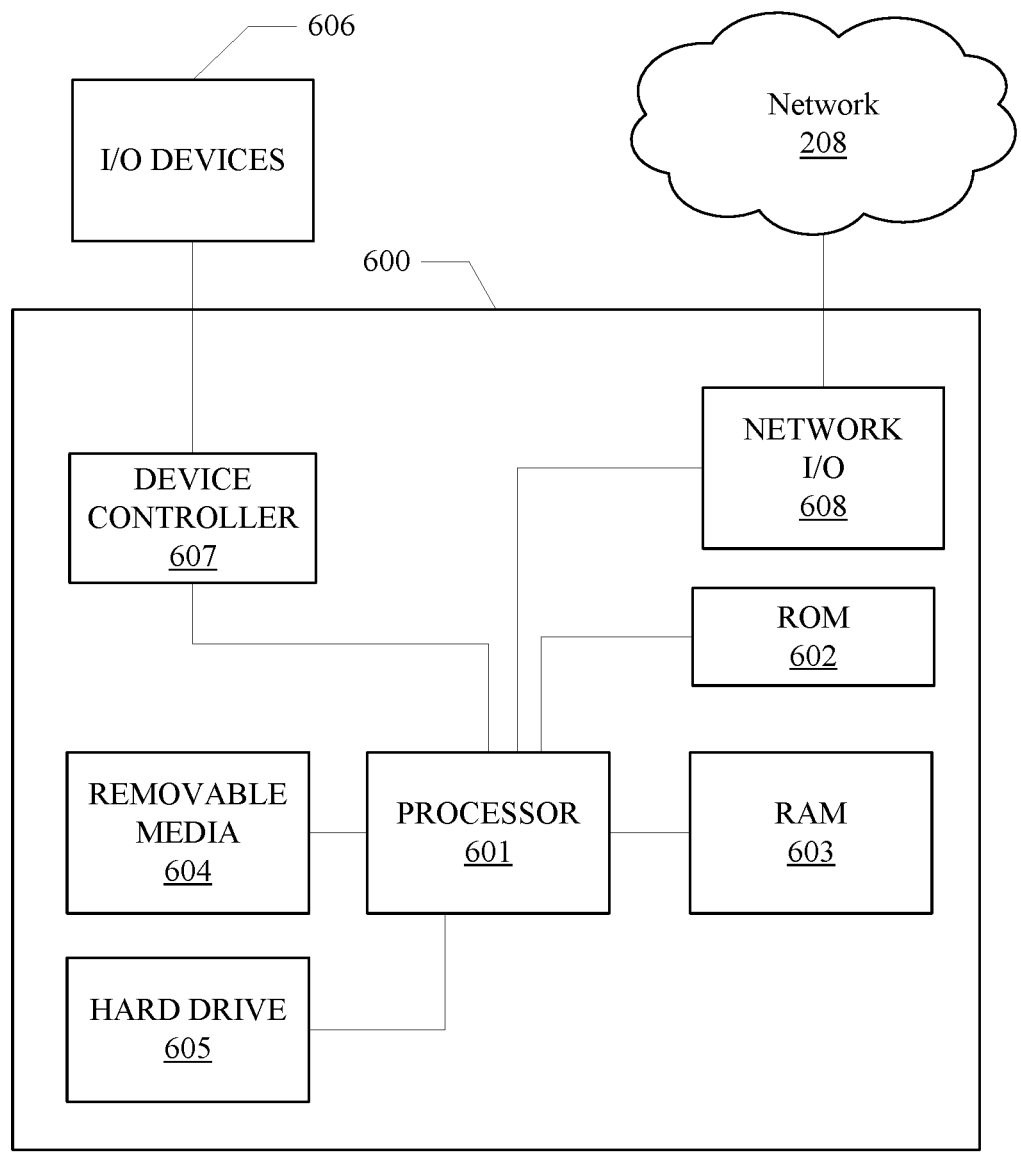
FIG. 6 is an example computing device in accordance with the teachings of this disclosure.

The audible signal detection component 210, the audible signal location detection component 212, the geographic analysis component 214, the audible signal analysis component 216, the networking component 218, the audible signal library 220, and more generally, the audible signal processing platform 204, and/or other computing devices described herein may be implemented via a hardware platform such as, for example, the computing device 600 illustrated in FIG. 6. The components described above and elements described with reference to the computing device 600 may be alternately implemented in software. The computing device 600 may include one or more processors 601, which may execute instructions of a computer program to perform any of the features described herein. The instructions may be stored in any type of tangible computer-readable medium or memory, to configure the operation of the processor 601. As used herein, the term tangible computer-readable storage medium is expressly defined to include storage devices or storage discs and to exclude transmission media and propagating signals. For example, instructions may be stored in a read-only memory (ROM) 602, random access memory (RAM) 603, removable media 604, such as a Universal Serial Bus (USB) drive, compact disk (CD) or digital versatile disk (DVD), floppy disk drive, or any other desired electronic storage medium. Instructions may also be stored in an attached (or internal) hard drive 605. The computing device 600 may include one or more input/output devices 606, such as a display, touch screen, keyboard, mouse, microphone, software user interface, etc. The computing device 600 may include one or more device controllers 607 such as a video processor, keyboard controller, etc. The computing device 600 may also include one or more network interfaces 608, such as input/output circuits (such as a network card) to communicate with a network such as example network 208. The network interface 608 may be a wired interface, wireless interface, or a combination thereof. One or more of the elements described above may be removed, rearranged, or supplemented without departing from the scope of the present disclosure.

Figure 7:
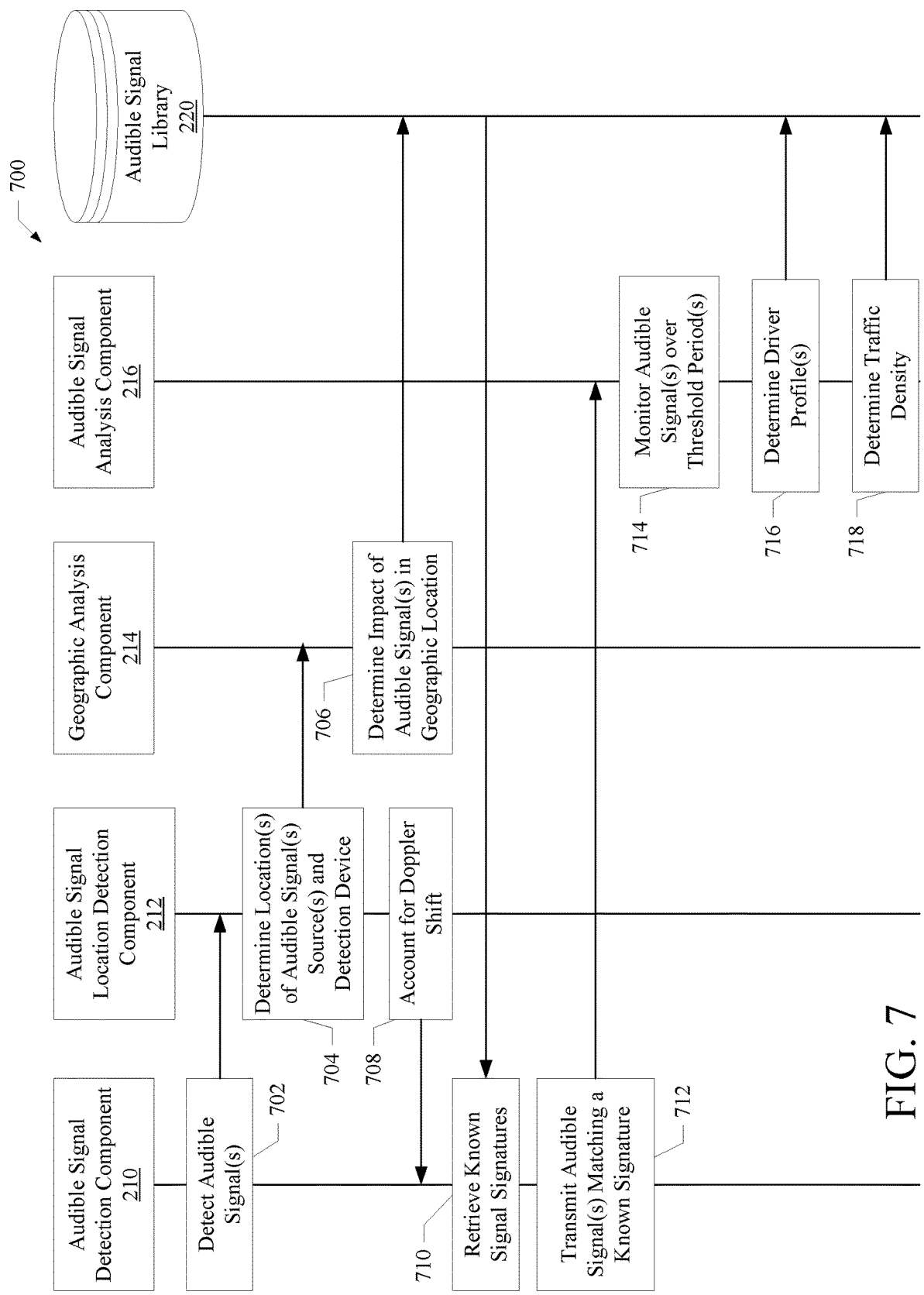
FIGS. 7-10 are example flowcharts to implement the teachings of this disclosure.

FIG. 7 is an example flowchart representative of machine readable instructions that, when executed, may cause a computing device to implement a process 700. The example process may begin with the audible signal detection component 210 detecting audible signals (702) in an environment, such as, for example, environment 100. As described with reference to FIG. 1, the audible signals may include vehicle horns or sirens. However, because multiple audible signals often combine and/or are received by a transducer at the same time, the audible signal detection component 210 may process the audible signals as further described in FIG. 8.

The audible signal location detection component 212 determines, based on the detected audible signals, the locations of the sources associated with the detected audible signals (704). Additionally, the audible signal location detection component 212 determines the location of the audible signal processing platform 204. In some examples, the sources of the audible signals and/or the audible signal processing platform 204 change location during detection of the audible signals. In some such examples, the frequencies, wavelengths, and/or intensity of the detected audible signals may vary in accordance with the Doppler Effect. The audible signal location detection component 212 accounts for the Doppler Shift (706) in the frequencies, wavelengths, and/or intensity as further described below with respect to FIG. 8.

The geographic analysis component 214 may determine an impact of the audible signals for the geographic location in which the audible signals are detected (708). For example, based on the amount of vehicle audible signals produced in a given geographic location, geographic analysis component 214 may determine a noise pollution level. In some examples, the audible signal processing platform 204 collects data for generating a noise pollution level every time the audible signal processing platform 204 is within a geographic location. Accordingly, the audible signal processing platform 204 may determine the noise pollution level without communicating with additional devices. In some such examples, multiple audible signal processing platforms 204 collect data for generating a noise pollution level and transmit the data to a server for aggregation and determination of the noise pollution level of the geographic area.

The geographic analysis component 214 may further determine air pollution caused by traffic events in the geographic area by correlating detected audible signals (and/or the amount of noise pollution) with a number of vehicles (e.g., the number of audible signal sources) and/or the carbon emissions associated with the number of vehicles. For example, an average vehicle emissions value may be multiplied by the number of vehicle audible signals identified in a geographic area during a threshold amount of time. The threshold amount of time may be associated with the length of a traffic event, which may be determined, for example, based on when a plurality of vehicles begin activation of horns to when the plurality of vehicles cease activation of the horns. Thus, the geographic analysis component 214 may determine both a social and environmental impact of the traffic event based on detected audible signals. Even further, the geographic analysis component 214 may collect traffic event data for a geographic area over time to determine whether a geographic area is more prone to traffic events, determine whether the geographic area is a potential cause of traffic events, allocate traffic event causation to the geographic area, and/or anticipate future traffic events in the geographic area.

The audible signal detection component 210 may retrieve, from the audible signal library 220, known signal signatures to compare to the detected audible signals to identify the type of audible signal (710). In some examples, the known signal signatures correspond to frequencies, wavelengths, intensities, and/or other waveform characteristics associated with different vehicle makes and models. For example, while car horns typically have two audible signal producing devices, which produce audible signals having frequencies at or around 500 Hz and 405-420 Hz, a first vehicle make and model may produce audible signals at or around 510±25 Hz and 410±25 Hz. Thus, the audible signal detection component 210 may be configured to identify that a detected audible signal is a vehicle horn or siren by matching detected frequencies, wavelengths, and/or intensities to the retrieved signal signatures. The audible signal detection component 210 may transmit audible signals matching signatures to the audible signal analysis component 216 (712).

The audible signal analysis component 216 may monitor audible signals over one or more threshold periods of time (714). For example, the audible signal analysis component 216 may determine a length of time that an audible signal is activated, a number of times that audible signals are activated from a signal source, and/or a number of times that audible signals are activated from numerous sources. Based on the length of time that audible signals are activated from a first source (e.g., a first vehicle) and the number of times that audible signals are activated from the first source, the audible signal analysis component 216 may determine a driver profile comprising driving behaviors associated with the first source (716). In some examples, an individual, such a driver or a passenger, of a vehicle comprising the first source may be associated with the driving behaviors and driver profile determined by the audible signal analysis component 216. In some examples, the individual may comprise the audible signal processing platform 204, and the audible signal processing platform 204 may determine, based on the distance between the audible signal processing platform 204 and the first source, whether the individual is a driver or a passenger. For example, the driver of the vehicle may be closer in distance to the first source than a passenger of the vehicle. The audible signal analysis component 216 may determine driver profiles for any number of individual associated with the audible signal processing platform 204.

The audible signal analysis component 216 may further determine, based on the number of times that audible signals are activated from numerous sources (e.g., vehicles), the traffic density of a geographic area (718). For example, instead of tracking numerous vehicles and devices to determine traffic congestion, the audible signal processing platform 204 collects audible signals from numerous vehicles to determine traffic congestion. For example, in a typical traffic event, as discussed with reference to FIG. 1, a number of vehicles activate horns or sirens. The audible signal processing platform 204 may identify, based on an aggregate intensity level of the vehicle horns, the frequency of which the vehicle horns are being activated, and/or the length of time that the vehicle horns are being frequently activated, that a traffic event is occurring. Accordingly, a single audible signal processing platform 204 may determine traffic density. The determined driver profile(s) and/or the determined traffic density may be transmitted, via the networking component 218, to a server and/or stored within the audible signal library 220.

Figure 8:
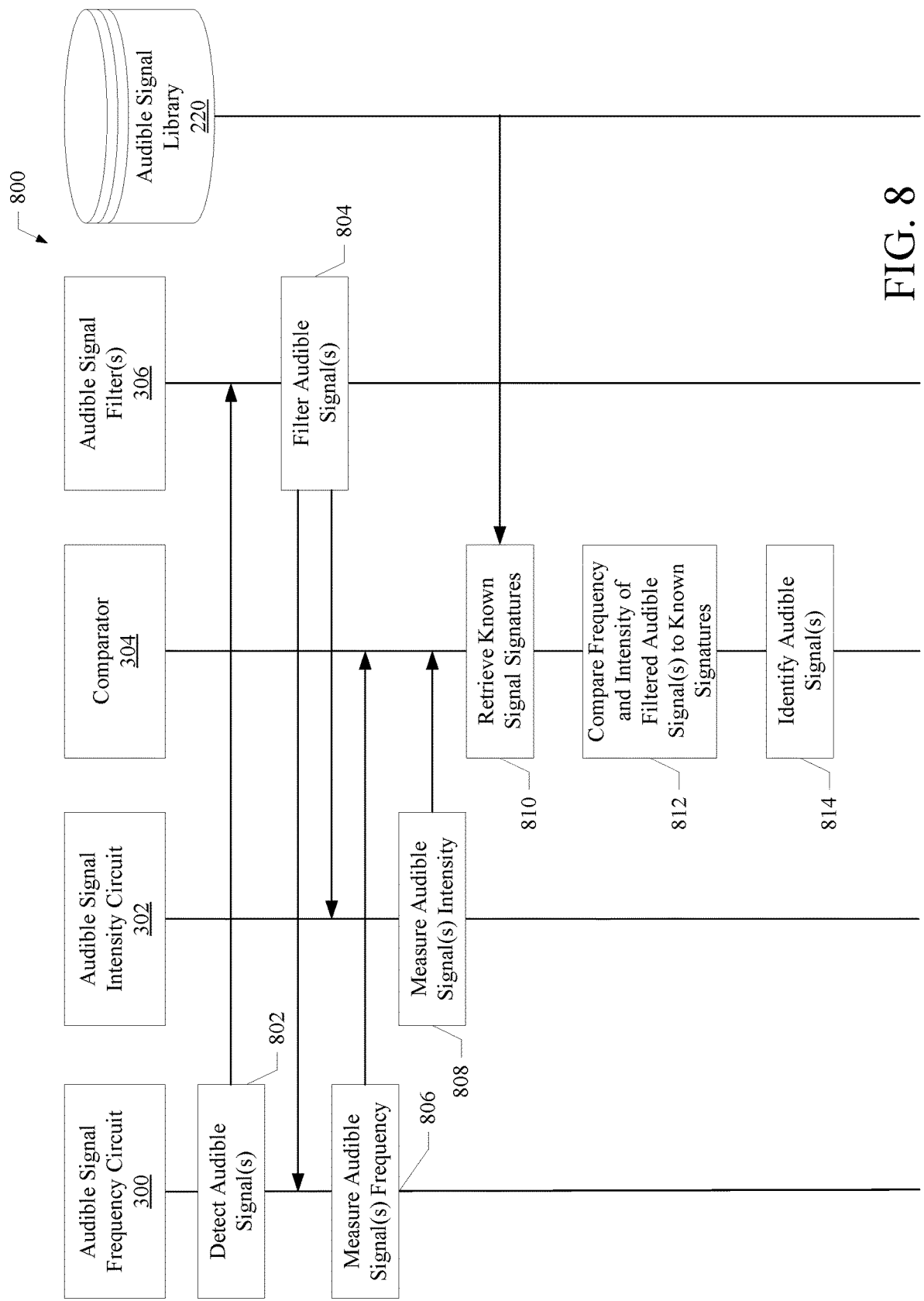

FIG. 8 is an example flowchart representative of machine readable instructions that, when executed, may cause a computing device to implement a process 800. The audible signal frequency circuit 300 of the audible signal detection component 210 detects the audible signals (802), and sends the detected audible signals to the audible signal filter(s) 306. The audible signal filter(s) 306 filter the audible signals (804), and send the filtered audible signals to the audible signal frequency circuit 300 and to the audible signal intensity circuit 302. As described herein, the audible signal filter(s) 306 eliminate noise from audible signals such as, for example, music, human communication, engine noise, or other sounds that would interfere with detection of vehicle horns. In some examples, the audible signal filter(s) 306 are band-pass filters that pass frequencies at or around 405-420 and/or 500 Hz. The audible signal frequency circuit 300 measures the frequency of the filtered audible signals to determine the exact frequency of the detected signal (806). The audible signal intensity circuit 302 measures the intensity of the filtered audible signals (808). In some examples, cle horns have intensities at or around 107-112 decibels. The comparator 304 retrieves known signal signatures from the audible signal library 220 (810) and compares the measured frequency and intensity of the filtered audible signals (812). The example comparator 304 identifies, based on the comparison, the filtered audible signals as vehicle horns (814). In some examples, the comparator 304 identifies the filtered audible signal as a specific vehicle horn (e.g., a horn of a particular vehicle make and model).

Figure 9:
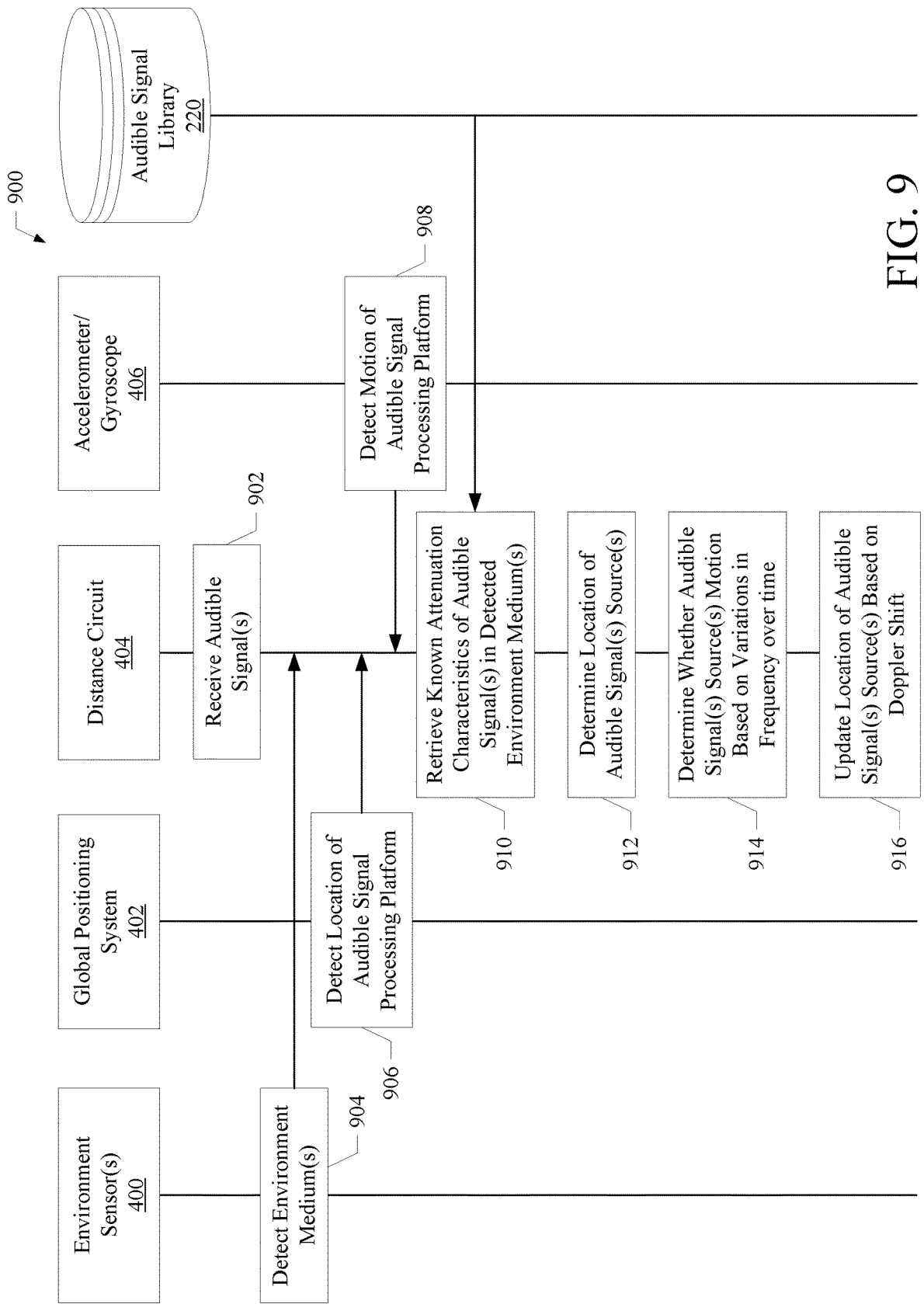

FIG. 9 is an example flowchart representative of machine readable instructions that, when executed, may cause a computing device to implement a process 900. The example distance circuit 404 of the example audible signal location detection component 212 receives audible signals from the audible signal detection component 210 (902). The environment sensor(s) 400 detect environment medium(s) through which the audible signals traverse (904). For example, air may be a common environment medium through which the audible signals traverse. However, vehicle, building, and/or infrastructure components such as, for example glass (e.g., windows), metal, brick, concrete, silicon, fiberglass, etc. may be detected by the environment sensors(s) 400. The detected environment mediums may be sent to the distance circuit 404 for use in determining the distances of received audible signals, as further discussed below.

The GPS 402 detects the location of the audible signal processing platform 204 (906) and transmits the location to the distance circuit. The distance circuit 404 may utilize the location of the audible processing platform 204 as a starting point in determining the distance of the audible signal source. As described above, the measurements of audible signals may vary in frequency if the source (or the receiver) are moving, accordingly to the Doppler Effect. Accordingly, the GPS 402 may update the location over time to enable the distance circuit 404 to accommodate the movement of the audible signal processing platform 204. Additionally or alternatively, the accelerometer/gyroscope 406 may detect motion of the audible signal processing platform 204 (908), to provide more granular motion data. The distance circuit 404 may retrieve, from the audible signal library 220 known waveform characteristics of audible signals for the detected environment mediums (910).

Based on the audible signals, the detected environment mediums, the location of the audible signal processing platform 204, and the known attenuation characteristics of the detected environment mediums, the distance circuit 404 may determine locations of the audible signal sources (912). The distance circuit 404 may utilize different techniques including sound pressure analysis, time difference of arrival using multiple microphones a known distance apart, triangulation, Steered-Response Power Phase Transform, etc. The distance circuit 404 may be configured to determine whether the audible signal sources move (e.g., based on determining the location of the audible signal sources over time or detecting frequency variations associated with the Doppler Effect) (914). Based on the detected motion of the audible signal sources, the example distance circuit updates the location of the audible signal source (916).

Figure 10:
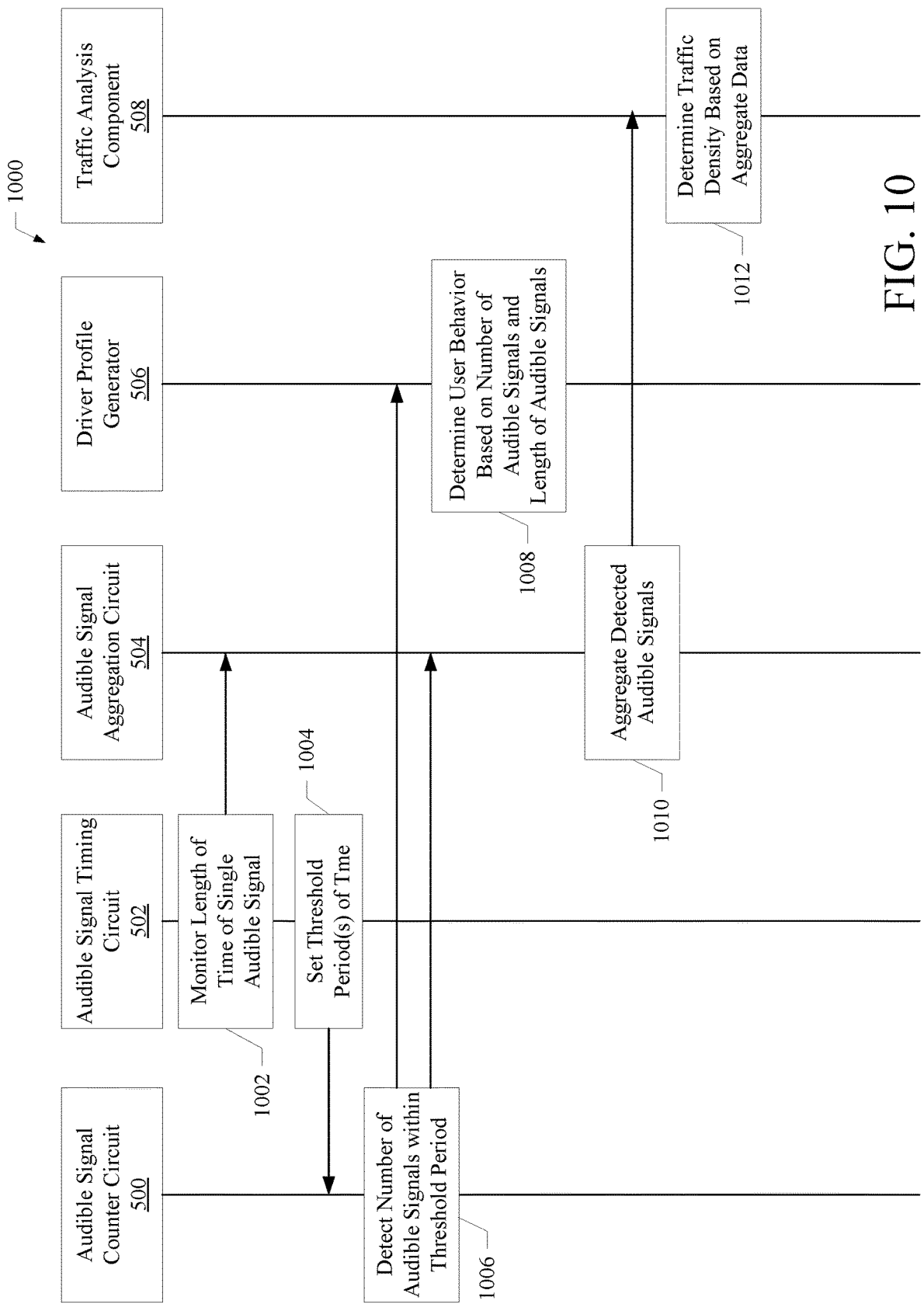

FIG. 10 is an example flowchart representative of machine readable instructions that, when executed, may cause a computing device to implement a process 1000. The audible signal timing circuit 502 monitors the length of time of a single audible signal (1002) and transmits the determined length of the audible signal to the audible signal aggregation circuit 504. As disclosed herein, the length of a single audible signal may provide information regarding the behavior of the driver. For example, a single short vehicle horn may be a courteous reminder to another driver, whereas an overly long vehicle horn may be a sign of road rage. However, the number of times a horn is activated in combination with the lengths of each horn may provide even more information regarding driver behavior. Accordingly, the audible signal timing circuit 502 may further set a threshold period of time for monitoring audible signals (1004). For example, the audible signal timing circuit 502 may set the threshold period of time to the entirety of the trip of a vehicle (e.g., associated with a navigation destination, from engine on to engine off, frequently traveled routes, etc.), the audible signal timing circuit 502 may set the threshold period of time to be a static time frame (e.g., an hour) and periodically monitor over the static time frame, or any combination thereof. The audible signal timing circuit 502 may transmit the determined threshold period(s) of time to the audible signal counter circuit 500. The audible signal counter circuit 500 may detect the number of audible signals within the determined threshold period of time and transmit this information to the audible signal aggregation circuit 504 and the driver profile generator 506 (1006).

The driver profile generator 506 determines, for a single audible signal source (e.g., the vehicle of the individual operating the audible signal processing platform 204) and based on the number of audible signals detected by the audible signal counter circuit 500 and the length of time of the detected audible signals monitored by the audible signal timing circuit 502, one or more user behavior characteristics (1008). Such user behavior characteristics may be aggregated into a driver profile for an individual and may include characteristics such as, for example, aggressiveness, patience, attitude, etc.

The audible signal aggregation circuit 504 aggregates audible signals detected from multiple sources and transmits the aggregated information to the traffic analysis component 508 of the audible signal processing platform 204 (1010). In some examples, the audible signal aggregation circuit 504 transmits the aggregated information to an external server via the networking component 218. In examples, wherein the audible signal aggregation circuit 504 transmits the aggregated information to the traffic analysis component 508 of the audible signal processing platform 204, the traffic analysis component 508 determines, based on the aggregated information, the traffic density in the geographic area around the audible signal processing platform 204 (1012).

The above discussed embodiments are simply examples, and modifications may be made as desired for different implementations. For example, steps and/or components may be subdivided, combined, rearranged, removed, and/or augmented; performed on a single device or a plurality of devices; performed in parallel, in series; or any combination thereof. Additional features may be added.

The invention claimed is:
1. A system comprising:
a vehicle comprising a vehicle horn; and
a computing device comprising:
  one or more processors; and
  memory storing instructions that, when executed by the one or more processors, cause the computing device to:
    detect a plurality of audible signals in a geographic area surrounding the vehicle;
    determine locations of the plurality audible signals;
    determine a location of the computing device;
    determine, based on the determined locations of the plurality of audible signals and based on the determined location of the computing device, waveform characteristics for the plurality of audible signals;
    compare the determined waveform characteristics for the plurality of audible signals to one or more signal signatures;
    determine, over a threshold period of time, a quantity of the plurality of audible signals that comprise waveform characteristics matching signatures of the one or more signal signatures; and
    determine, based on the quantity of the plurality of audible signals, a traffic density for the geographic area.

2. The system of claim 1, wherein the threshold period of time is from a first time at which an engine of the vehicle is turned on to a second time at which the engine of the vehicle is turned off.

3. The system of claim 1, wherein the instructions, when executed, cause the computing device to:
filter the audible signal to remove signals with frequencies outside of a frequency range.

4. The system of claim 3, wherein the frequency range comprises 400 hertz (Hz) to 500 Hz.

5. The system of claim 1, wherein the plurality of audible signals is a first plurality of audible signals, and wherein the instructions, when executed, cause the computing device to:
   determine, for the vehicle, lengths of time that the vehicle horn emits a second plurality of audible signals; and
   determine, based on the lengths of time and based on a quantity of the second plurality of audible signals within a threshold period of time, a driver profile.

6. The system of claim 1, wherein the instructions, when executed, cause the computing device to:
   determine, based on the quantity of the plurality of audible signals, a noise pollution level.

7. The system of claim 1, wherein the instructions, when executed, cause the computing device to:
   determine, based on the quantity of the plurality of audible signals, a vehicle emissions pollution level.

8. A method comprising:
   detecting, by a computing device, a plurality of audible signals in a geographic area;
   determining locations of the plurality audible signal;
   determining a location of the computing device;
   determining, based on the determined locations of the plurality of audible signals and based on the determined location of the computing device, waveform characteristics for the plurality of audible signals;
   comparing the determined waveform characteristics for the plurality of audible signals to one or more signal signatures;
   determining, over a threshold period of time, a quantity of the plurality of audible signals that comprise waveform characteristics matching signatures of the one or more signal signatures; and
   determining, by the computing device and based on the quantity, a traffic density for the geographic area.

9. The method of claim 8, further comprising:
   filtering the audible signal to remove signals with frequencies outside of a frequency range.

10. The method of claim 9, wherein the frequency range comprises 400 hertz (Hz) to 500 Hz.

11. The method of claim 8, wherein the plurality of audible signals is a first plurality of audible signals, the method further comprising:
   determining, for an audible signal source that produces a second plurality of audible signals having waveform characteristics that match at least one signature of the one or more signal signatures, lengths of time of the second plurality of audible signals; and
   determining, based on the lengths of time and based on a quantity of the second plurality of audible signals within a threshold period of time, a driver profile.

12. The method of claim 8, further comprising:
   determining, based on the quantity of the plurality of audible signals, a noise pollution level.

13. The method of claim 8, further comprising:
   determining, based on the quantity of the plurality of audible signals, a vehicle emissions pollution level.

14. The method of claim 8, wherein the audible signals comprise vehicle horns.

15. An apparatus comprising:
   one or more processors; and
   memory storing instructions that, when executed by the one or more processors, cause the apparatus to:
      detect a plurality of audible signals in a geographic area;
      determine locations of the plurality audible signal;
      determine a location of the apparatus;
      determine, based on the determined locations of the plurality of audible signals and based on the determined location of the apparatus, waveform characteristics for the plurality of audible signals;
      compare the determined waveform characteristics for the plurality of audible signals to one or more signal signatures;
      determine, over a threshold period of time, a quantity of the plurality of audible signals that comprise waveform characteristics matching signatures of the one or more signal signatures; and
      determine, based on the quantity, a traffic density for the geographic area.

16. The apparatus of claim 15, wherein the instructions, when executed, cause the apparatus to:
   filter the audible signal to remove signals with frequencies outside of a frequency range.

17. The apparatus of claim 16, wherein the frequency range comprises 400 hertz (Hz) to 500 Hz.

18. The apparatus of claim 15, wherein the plurality of audible signals is a first plurality of audible signals, and wherein the instructions, when executed, cause the apparatus to:
   determine, for an audible signal source that produces a second plurality of audible signals having waveform characteristics that match at least one signature of the one or more signal signatures, lengths of time of the second plurality of audible signals; and
   determine, based on the lengths of time and based on a quantity of the second plurality of audible signals within a threshold period of time, a driver profile.

19. The apparatus of claim 15, wherein the instructions, when executed, cause the apparatus to:
   determine, based on the quantity of the plurality of audible signals, a noise pollution level.

20. The apparatus of claim 15, wherein the instructions, when executed, cause the apparatus to:
   determine, based on the quantity of the plurality of audible signals, a vehicle emissions pollution level.

* * * * *